United States Patent [19]
Haab et al.

[11] Patent Number: 5,428,357
[45] Date of Patent: Jun. 27, 1995

[54] HIGH SPEED DATA ACQUISITION SYSTEM AND METHOD

[75] Inventors: Dan Haab, Springville; Dan Patten, Orem; Richard Rollins, West Valley City; Kent Johnson, Spanish Fork; Edgar D. Lee, Highland, all of Utah

[73] Assignee: Sensar Corporation, Sandy, Utah

[21] Appl. No.: 69,084

[22] Filed: May 28, 1993

[51] Int. Cl.⁶ ............................................. H03M 1/12
[52] U.S. Cl. .................................................. 341/155
[58] Field of Search ...................... 341/155, 156, 158; 250/281, 282, 288

[56] References Cited
U.S. PATENT DOCUMENTS 3,639,741  1/1972  Carrick ............................... 250/281
4,642,778  2/1987  Hieftje et al. ....................... 364/498

Primary Examiner—Brian K. Young
Attorney, Agent, or Firm—Thorpe, North & Western

[57] ABSTRACT

A high speed data acquisition system which acquires an analog signal, converts it to digital data, and compresses the large volume of accumulated data into a format that can be handled in a microcomputer environment. The data acquisition system of the present invention can rapidly and continuously acquire and process large volumes of data. Included is an averaging circuit which allows the present invention to efficiently process and store large amounts of data uninterruptedly. The present invention is thus well suited for applications that require uninterrupted high-speed sampling over long periods of time.

19 Claims, 8 Drawing Sheets

HIGH SPEED DATA ACQUISITION SYSTEM AND METHOD

BACKGROUND

1. The Field of the Invention

This invention relates to systems and methods for gathering and storing data from a variety of sources. More particularly, the present invention relates to systems and methods for acquiring, storing, and averaging data in real time as it is derived from a data generating event.

2. The Prior Art

Electronic systems which are found in science, industry, and society often require that information concerning some event be gathered, stored, manipulated, and analyzed. Such data acquisition systems range from those which gather data at a relatively slow rate to those which must gather very accurate data at a very high rate. For example, sensing the coolant temperature in an automobile engine is a common example of gathering information and displaying the information which can be satisfactorily gathered a few times each second and the accuracy need not be exact. In contrast, a guidance system for a missile may require that very accurate information be gathered, stored, and analyzed billions of times each second.

Most physical phenomenon are best characterized as analog events where changes from one value to the next occur as smooth continuous transitions. Digital information processing techniques, however, are best suited for gathering, storing, and analyzing information.

An analog to digital convertor is an electrical device that converts an analog signal to a digital signal. Once the analog signal has been converted to a digital signal it can be manipulated and stored by computing equipment which is commonly available. For example, it is now common to take the analog signal generated by the coolant temperature sensor in automobiles, pass it through an analog to digital convertor where it is converted to a digital format, and then convey it to a computer which calculates other engine criteria and where the coolant temperature is reported in digits on a dashboard display.

There are numerous applications where digital data from analog to digital convertors is gathered, stored, and analyzed. For example, digital data is encountered in areas such as avionics, radar, industrial measurement and control, medical equipment, chemical analysis equipment, and so forth. An analog to digital converter, by itself, often is fabricated on a single integrated circuit. However, where data is to be stored, manipulated, or analyzed, a data acquisition system, which includes an analog to digital convertor, must be fashioned. In applications where large amounts of digital data must be very accurately gathered and stored, the data acquisition system becomes very complex. The particular configuration of the data acquisition system is dependent upon the end application.

Several criteria are commonly used to evaluate most digital data acquisition systems. One such criteria is its sampling rate, that is, how fast it can convert analog signals to digital signals. Another criteria for data acquisition systems is their data storage capability. Generally, it is very desirable if a data acquisition system can store and preserve large amounts of the data it has accumulated. Those skilled in the art will recognize that designing a data acquisition system which combines large data storage capability with a high sampling rate can be difficult. This is especially true when large (for example, greater than a few megasamples) data storage is required. There are, for example, available data acquisition systems which have sample rates of 100 MHz. Storing data which is gathered at high sampling rates is difficult, especially if the data is to be accumulated for more than a few milliseconds.

A third major criteria of data acquisition systems is averaging capability. It is often advantageous to perform averaging on a given signal, especially when the signal is associated with a repetitive pulse where averaging techniques are readily applied. Averaging of the data provides advantages such as decreasing the amount of storage required, allowing slower storage devices to be used, reducing unwanted random background noise, and increasing the effective resolution of the actual data acquisition system.

In view of the advantages which accrue when averaging techniques are used, some data acquisition systems are optimized to take advantage of averaging. Other data acquisition systems are not optimized to carry out averaging. When averaging is needed, a data acquisition system which is optimized to carry out averaging will perform better than a data acquisition system which is not. Conversely, when averaging is not suitable, a data acquisition system which is not optimized to carry out averaging will perform better than a data acquisition system which is optimized to perform averaging.

In view of the foregoing, it would be an advance in the art to provide a data acquisition system which overcomes the drawbacks present in the art.

BRIEF SUMMARY AND OBJECTS OF THE INVENTION

In view of the above described state of the art, the present invention seeks to realize the following objects and advantages.

It is an object of the present invention to provide an improved high speed data acquisition system and an accompanying method.

It is a further object of the present invention to provide a data acquisition system and method which can average inputted data in real time efficiently and without delaying the processing of data.

It is also an object of the present invention to provide a data acquisition system and method wherein averaging of data can occur on numbers of time windows or scans which are not binary increments.

It is another object of the present invention to provide a data acquisition system and method which can selectively average or not average inputted data and process the data quickly and with high resolution.

It is also an object of the present invention to provide a data acquisition system and method which can optimally acquire data using data averaging techniques or not using data averaging techniques.

It is another object of the present invention to provide a data acquisition system and method which is particularly suitable for acquiring data from a mass spectrometer detector.

These and other objects and advantages of the invention will become more fully apparent from the description and claims which follow, or may be learned by the practice of the invention.

The present invention provides a high speed data acquisition system which acquires an analog signal, converts it to digital data, and compresses the large volume of accumulated data into a format that can be handled in a microcomputer environment. The data acquisition system of the present invention can rapidly and continuously acquire and process large volumes of data.

The averaging method of the present invention is particularly advantageous. The averaging method allows the present invention to efficiently store large amounts of data uninterruptedly. The present invention is thus well suited for applications that require uninterrupted high-speed sampling over long periods of time.

In accordance with one aspect of the present invention, a method of averaging a repetitive signal during a test period is provided. The method includes the step of determining the number of time windows (also referred to as scans when dealing with a mass spectrometer) of the repetitive signal which will be made during the test period. The method also calculates a plurality of potential average values representing all of the possible average values of the repetitive signal based upon the number of time windows (scans) which will be made during the test period and the resolution of the resulting final average value. The plurality of potential average values are loaded into a look-up table. The acquisition of data then begins by converting the repetitive signal into a current digital sample. A current average value is selected from the look-up table, the current average value corresponding to the value of the current digital sample. The current average value is then summed with a previous average value stored in a buffer, the previous average value corresponding to at least one average value selected from the look-up table and corresponding to at least one previous digital sample. The resulting sum is then stored in the buffer and the steps of converting, selecting from the look-up table, and summing are continued until the number of digital samples obtained at least equals the number of time windows (scans) to be made. The average value is then output.

In accordance with another aspect of the present invention, a system for averaging a repetitive signal during a test period is provided. Provided is a means for user inputting of the number of time windows (scans) of the repetitive signal which will be made during the test period. A means for calculating a plurality of potential average values representing all of the possible average values of the repetitive signal based upon the number of time windows (scans) which will be made during the test period and the resolution of the resulting final average value is also included. A look-up table means for storing the plurality of potential average values is further provided. A means for converting the repetitive signal into a current digital sample and a means for selecting a current average value from the look-up table which corresponds to the value of the current digital sample is furnished. A buffer for storing at least one previous average value average is provided as well as a means for summing the current average value with the at least one previous average value stored in the buffer, the at least one previous average value corresponding to at least one average value selected from the look-up table corresponding to at least one previous digital sample. Also provided is a means for storing the resulting sum in the buffer and continuing to sum the current average value with the at least one previous average value until the number of digital samples obtained at least equals the number of time windows (scans) and a means for outputting the value of the buffer representing the average of all of the digital samples which were obtained during the test.

In accordance with another aspect of the present invention, the acquired data can take a "pass through" path wherein averaging is performed on the signal or a "high speed path" through the data acquisition system. To provide both the pass thorough path and the high speed path, a means for real time storing of the digital samples in real time, a means for long term storing of the digital samples, and a means for selecting a data path which subjects the digital samples to the means for averaging before conveying the digital samples to the means for real time storing or the means for long term storing or a data path which passes the digital samples to the means for real time storing or the means for long term storing without subjecting the digital samples to the means for averaging can also be preferably provided.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1A:
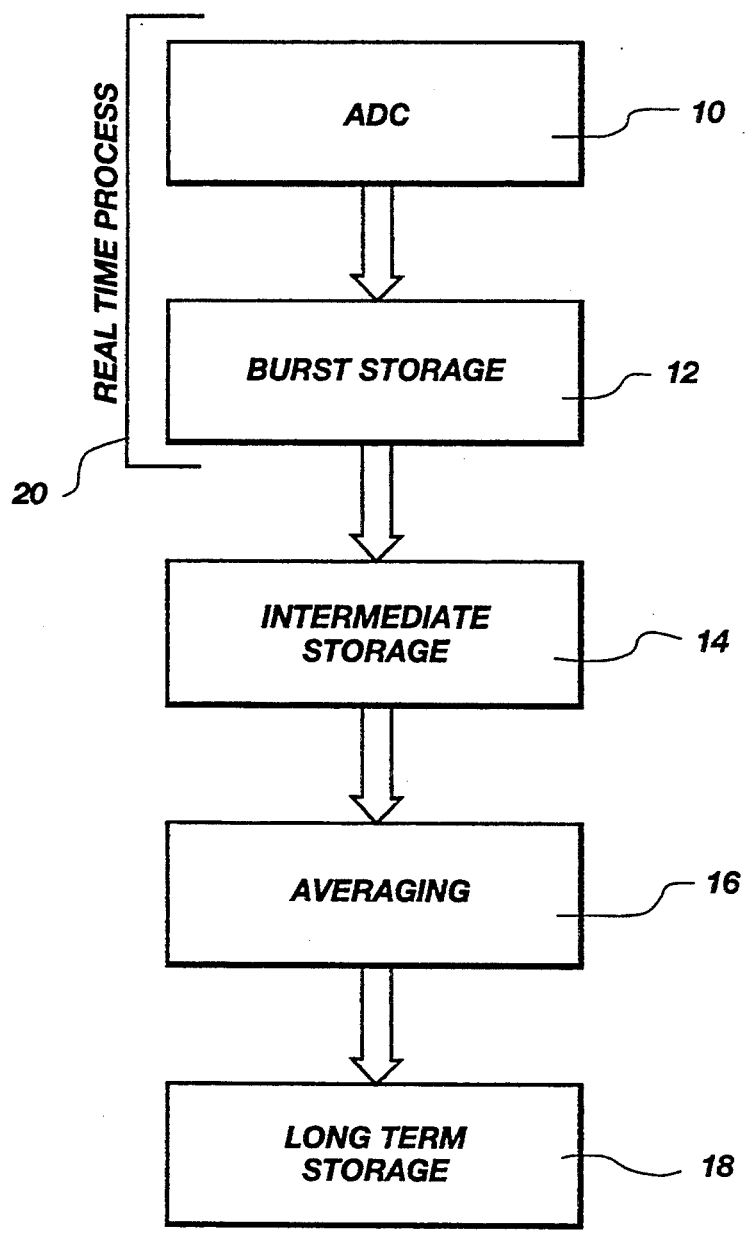
FIG. 1A is a flow chart showing the organization of a prior art data acquisition system optimized for no averaging.

Reference will now be made to the drawings wherein like structures will be provided with like reference designations.

As indicated earlier, in some instances it is very desirable to optimize a data acquisition system for averaging the data as it is gathered. Averaging provides several advantages.

First, in a properly designed averaging data acquisition system, less data storage space is required since there is less data to be stored. The amount of storage required is calculated by Equation (1).

$$\text{Memory Required} = \frac{(\text{Sampling Rate})(\text{Test Duration})}{\text{\# of Averages}} \quad (1)$$

where:

Memory Required is in samples; Sampling Rate is in Hz; Test Duration is in seconds.

As shown by Equation (1), the storage requirement is decreased in direct proportion to the number of averages taken with other parameters remaining constant.

Second, when averaging is used the speed at which the storage devices can input and output data can be reduced.

This is because averaged data appears at the storage devices at a reduced rate as expressed by Equation (2).

$$s = \frac{r}{n} \quad (2)$$

where:
s = memory speed in seconds
r = sampling rate in Hz
n = number of averages The memory speed parameter provides the requirement for an initial module of memory which is included in the data acquisition system with other modules having the same or lesser speed characteristics. For a high speed data acquisition system the initial module of memory, also referred to as a buffer, is typically comprised of high speed static random access memory (SRAM) as is known in the art. For example, in the case of a data acquisition system sampling data at 100 MHz with no averaging the SRAM buffer would need to store data at 10 nanosecond intervals. If it is necessary to store more than a few million samples the previously available methods and devices require circuit arrangements which are cost prohibitive in the case of many applications. Conversely, if the same data which was sampled at 100 MHz was averaged 1,000 times before being stored, the memory devices would only be required to store data at 10 microsecond intervals. Memory devices which can store data at 10 nanosecond intervals are much more expensive per bit of data storage capability than memory devices which can store data at only 10 microsecond intervals.

Third, another beneficial effect of averaging is that the influence of unwanted random background noise is reduced. As is known in the art, as more data is averaged, the signal-to-noise ratio of resulting signal improves.

Fourth, averaging of data appreciably increases the effective resolution of the data acquisition system. For example, a typical data acquisition system may provide resolution of 8 data bits ($2^8 = 256$ levels). Sufficient averaging (normally at least 150 to 200 times) can result in an effective increase of resolution to 10 or 11 bits (1,024 and 2048 levels, respectively).

Until the advent of the present invention, high performance data acquisition systems, e.g., where the acquisition and storage of data occur at greater than 10 million samples per second, followed one of two schemes.

One scheme is to optimize the data acquisition system without averaging.. That is, such a data acquisition system can perform averaging but the data acquisition system is not inherently designed to efficiently average. The block diagram of FIG. 1A shows a simplified arrangement for a data acquisition system optimized for no averaging.

Another scheme is to optimize the data acquisition system with averaging. The block diagram of FIG. 1B shows a simplified arrangement for a data acquisition system optimized for averaging. As would be expected by one of skill in the art, if averaging is necessary, the data acquisition system optimized for averaging will perform better than the data acquisition system optimized for no averaging.

Figure 1B:
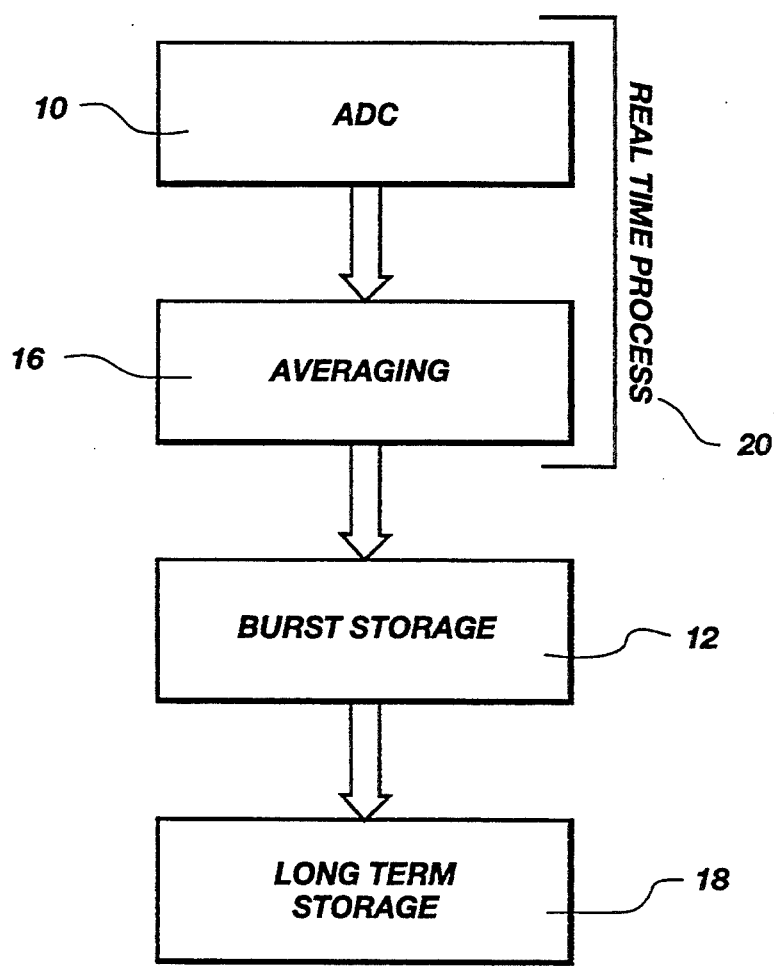
FIG. 1B is a flow chart showing the organization of a prior art data acquisition system optimized for averaging.

Referring now to FIG. 1A, in the data acquisition system optimized for no averaging, rapid data acquisition can take place for short periods of time by providing a burst storage area 12. The gathered data is transferred from the analog-to-digital convertor (ADC) 10 in real time (as indicated by bracket 20) to the burst storage 12. The burst storage 12 typically consists of an array of high speed SRAM devices. For no data loss to occur the burst storage 12 must store data at a rate equivalent to the sampling rate.

When the burst storage 12 is full the data must be transferred to intermediate storage 14 before further sampling can occur. In the previously available systems, the transfer of data from burst storage 12 to intermediate storage 14 is typically accomplished by some type of commonly-known data transfer bus arrangements such as those referred to as an AT bus, VL bus, GPIB bus, IEEE bus, VME bus, or so forth.

The arrangement of the data transfer bus is important. With some of the commonly used previously used bus arrangements the process of transferring large amounts of data can take a significant amount of time compared to the acquisition time. For example, a typical high speed data acquisition system may acquire data at 100 MSamples/second and have burst storage capability for one million samples. In such a case the burst storage 12 would fill in 10 milliseconds. A typical transfer rate to the intermediate storage 14 found in previously available data acquisition systems is approximately 2 MSamples/second. To transfer the one million samples stored in burst storage 12 requires 0.5 seconds (1 MSamples at a rate of 2 MSamples per second). Because the ADC 10 is idle during the data transfer period, the effective duty cycle of the collection/storage portion of the prior art data acquisition system is less than 2% (0.01 second/0.51 second).

Once the data resides in intermediate storage 14 it can then be manipulated and subjected to an averaging circuit 16 as necessary. Importantly, in the prior art data acquisition system represented in FIG. 1A the process carried out by the averaging circuit 16 is not a real time process as indicated by bracket 20. After averaging 16 the data is then transferred to a long term storage 18. While the ADC 10 and burst storage 12 continues the acquisition process during averaging 16 and transfer to long term storage 18, prior art data acquisition systems suspend data acquisition during this transfer time thus further reducing the effective duty cycle of the prior art data acquisition system.

Referring now to FIG. 1B, in the data acquisition system optimized for averaging, data is transferred from the ADC 10 to the averaging circuit 16 so that averaging occurs in real time (as indicated by bracket 20) while the data is collected rather than after transfer to intermediate storage 14 (FIG. 1A). When processing by the averaging circuit 16 is complete, the data is transferred to the burst storage area 12. Similarly to the case of the data acquisition system optimized for no averaging, in the data acquisition system optimized for averaging represented in FIG. 1B the ADC 10 is idle during the transfer of data from the averaging circuit 16 to the burst storage 12. In the case of one particular prior art data acquisition system patterned after the scheme represented in FIG. 1B, it takes approximately 4 milliseconds to transfer data from the averaging circuit 16 to the burst storage 12 and then reset the averaging circuit 16 before the next acquisition cycle can begin.

As an example, assume that the number of averages to be obtained is set to 100, and the sampling rate is 100 MHz. For averaging to be carried out efficiently the data must be of a repetitive nature. A time-of-flight mass spectrometer device is an example of an instrument that produces a pulsed wave form and which generates large amounts of data which must be rapidly acquired. A typical repetitive time slice in the case of a time-of-flight mass spectrometer is 200 $\mu$s. Using these parameters, an averaged sample group (200 $\mu$s wide, containing 20,000 data samples) would be transferred to burst storage 12 every 24 milliseconds ((200 $\mu$s)(100)+4 milliseconds). Once the burst storage 12 is full, the data must be transferred to long term storage 18 before additional data acquisition can take place. Even further, assuming that the burst storage 12 can store 1 MSamples and that data can be transferred from burst storage 12 to long term storage 18 at a 2 MSamples/second transfer rate, it would take approximately 0.5 seconds to transfer one million samples of data from burst storage 12 to long term storage 18 (FIG. 1B). To calculate the overall efficiency of the prior art data acquisition system with the number of averages set to 100, and 20,000 samples being taken every 200 $\mu$s, the time and efficiency to transfer to the 1 MSample burst storage area are calculated as set forth in Equations (3) and (4).

$$\text{Time} = \frac{(24 \text{ ms})(1 \text{ Million Samples})}{20,000 \text{ Samples}} \quad (3)$$

$$\text{Efficiency} = \frac{20 \text{ ms}}{20 \text{ ms} + 4 \text{ ms}} \quad (4)$$

In Equations (3) and (4) Time is calculated at 1.2 seconds and the Efficiency at 83%. This leads to the number of samples being taken over the 5 second time frame as expressed in Equation (5).

$$\text{Number of Samples} = (83\%)(1.2 \text{ sec})(100 \text{ MHz}) \quad (5)$$

From Equation (5), the Number of Samples is calculated at 99.6 million. By adding the 0.5 second transfer to long term storage time to the 1.2 second acquisition time, the overall efficiency can be calculated using Equation (6).

$$\text{Overall Efficiency} = \frac{99.6 \text{ Million Samples}}{(100 \text{ MHz})(1.7 \text{ seconds})} \quad (6)$$

In the example of Equation (6), the overall efficiency is calculated at better than 58%. This compares to less than about 2% under the same circumstances using a prior art data acquisition system which is optimized for no averaging as represented in FIG. 1A.

The situation where averaging is reduced to 0, or the same data acquisition system is used with no averaging, with all other variables unchanged, the efficiency of the prior art data acquisition system reduces to approximately 1.4%. Even though an efficiency of approximately 1.4% (obtained when averaging is not used in a data acquisition system which is optimized for averaging) is only somewhat reduced from the about 2% efficiency achieved with the non-averaging system, the number of data points collected by the data acquisition system optimized for averaging when averaging is not used is actually about one half of what was collected with the prior art non-averaging system.

In view of the prior art arrangements, it will be appreciated that until the advent of the present invention, one was faced with obtaining a data acquisition system optimized for averaging and a data acquisition system optimized for no averaging if the best possible results were desired in all cases. Otherwise, if only a data acquisition system optimized for only no averaging or optimized for only averaging was obtained, performance suffered under some circumstances. Moreover, while a data acquisition system optimized for averaging provides better overall performance, a data acquisition system optimized for averaging is more complex and more costly than a data acquisition system optimized for no averaging.

Figure 2:
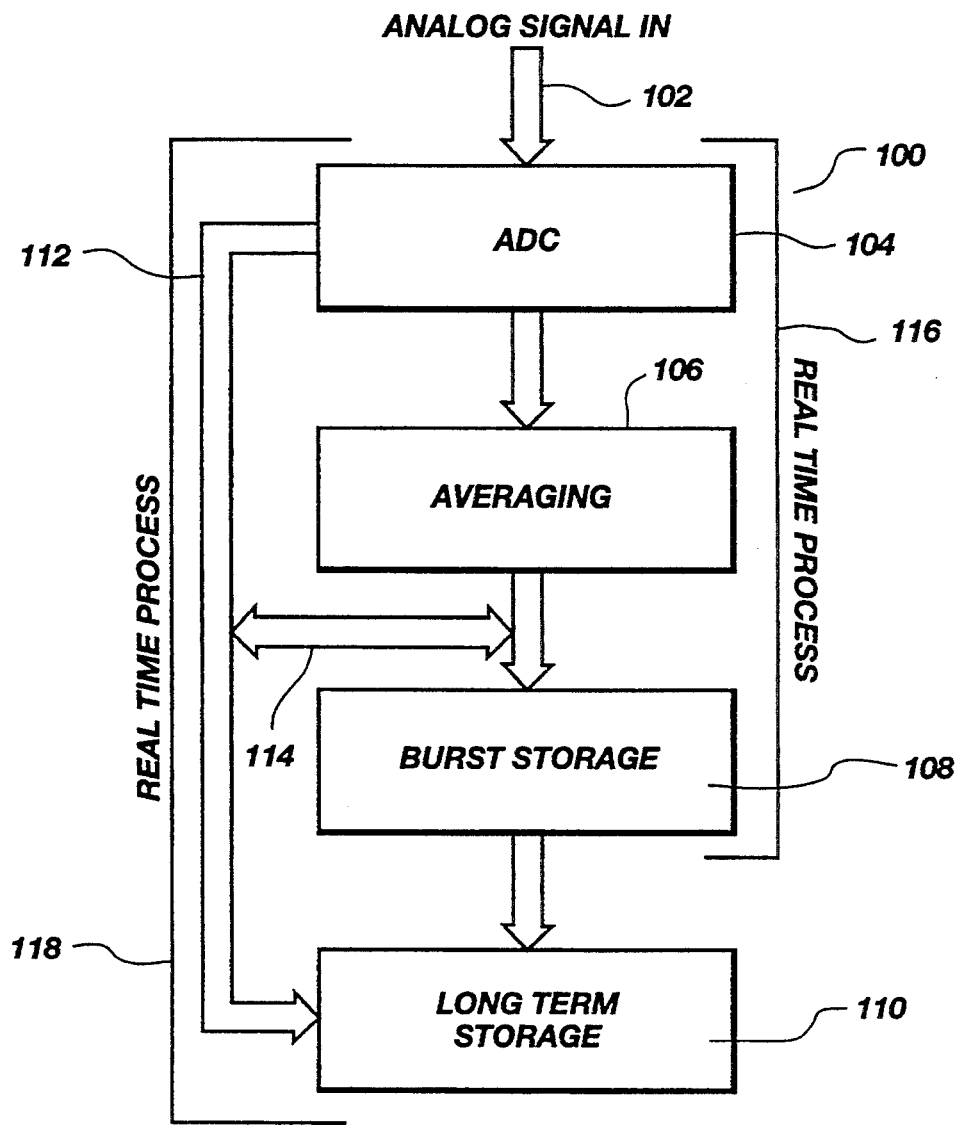
FIG. 2 is a high level block diagram of a circuit board card incorporating the data acquisition system of the present invention.

The block diagram of FIG. 2 illustrates the high level structure of the data acquisition system of the present invention generally indicated at 100. As will be explained, the data acquisition system of the present invention provides the advantages and benefits of both a data acquisition system optimized for no averaging and a data acquisition system optimized for averaging. That is, when no averaging is desired (e.g., when single shot data is being gathered) the data acquisition system of the present invention acquires and passes data uninterrupted along the data path represented at 112 in FIG. 2. Alternatively, when averaging is required, the data acquisition system of the present invention acquires, averages, and passes averaged data along the data path indicated at 119 in FIG. 2.

Still referring to FIG. 2, data can take different paths through the data acquisition system depending upon the type of data requested in long term storage 110. An analog signal is input at 102 to an ADC (analog-to-digital converter) 104. The decision to subject the data to averaging is made prior to each test: and cannot be changed during a test. If averaging is to occur, the number of averages to be taken is determined prior to each test. If averaging in the data acquisition system 100 is active, data is passed along the path indicated at 119 from the ADC 104 to an averaging circuit 106.

If averaging is active, data is passed from the averaging circuit 106 to a burst storage 108 (the use of the burst storage 108 will be explained further shortly) and then onto a long term storage 110. As indicated by bracket 116, the operations of the ADC 104, the averaging circuit 106, and the burst storage 108 all occur in real time when averaging is active. In the delta acquisition system 100 averaging occurs essentially as a background task to the remaining operations and has little or no influence over their timing.

If averaging is not active for the test, the data acquisition system 100 still is able to perform optimally by using the data path represented at 112. Prior to conducting a test using the data acquisition system of FIG. 2, it must be decided whether or not to use the burst storage 108. If the burst storage 108 is not used, the data can travel directly from the ADC 104 to the long term storage 110 along the data path 112. If burst storage is to be used, the data from the ADC 104 takes data path 114 to the burst storage 108. The bracket 118 indicates that the traveling of data along data path 112 and data path 114 occurs in real time.

The burst storage 108 is a high speed memory storage area designed to accommodate single shot data which is processed through the ADC 104 in real time. Since the burst storage 108 is very high speed, only a limited amount can be provided due to cost constraints. Additionally, use of the burst storage requires that acquisition of data by the ADC be terminated while data is downloaded from the burst storage 108 into the long term storage 110. Thus, it will be appreciated that use of the burst storage 108 presents two considerations: (1) the test length is limited; and, (2) the test must stop during the period when data is being transferred from the burst storage 108 to the long term storage 110. The influence of these considerations on the decision to use the burst storage 108 will be explained next.

Figure 3:
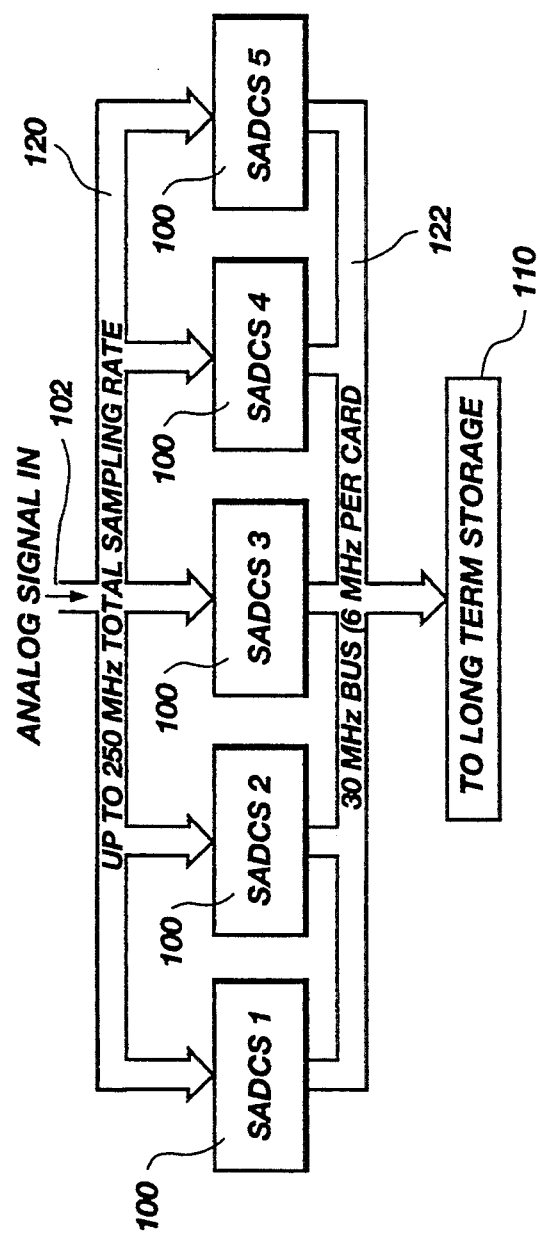
FIG. 3 is a high level block diagram of the data acquisition system of the present invention incorporating five circuit board cards represented in FIG. 2.

As represented in FIG. 3, the data acquisition system of the present invention can preferably comprise a plurality of discrete circuit board cards each generally designated at 100 in FIG. 3 and each containing the principal components of the data acquisition system represented in FIG. 2 as will be explained shortly. It will be appreciated that the present invention may be carried out with the circuit arrangements illustrated in FIG. 2 fabricated on a single circuit board, on a plurality of circuit boards as represented in FIG. 3, or in any number of other arrangements now known in the art or devised in the future including fabricating all or portions of the data acquisition system of the present invention as an integrated circuit.

The arrangement illustrated in FIG. 3 preferably includes five circuit boards or cards 100 each containing the ADC 104, the averaging circuit 106, and the burst storage 108. The inputs of each of the cards 100 are connected in parallel to a signal input 102. With each of the five cards 100 having a capability of sampling at 50 MHz, with the operation of all of the cards being coordinated, the combined total sampling rate is 250 Mhz.

Each of the cards 100 can output data at 6 MHz. The output of each of the cards 100 is passed to a 30 MHz bus (5 times 6 MHz) where it is conveyed to long term storage which is shared by all of the cards 100. It will be appreciated that different sampling rates and different rates of output can be used within the scope of the present invention if desired. Those skilled in the art will be able to arrive at the appropriate detailed circuit arrangements using the information set forth herein.

Referring now to FIGS. 2 and 3, the decision of whether or not to use the burst storage provided on each card (108 in FIG. 2) will be discussed. The decision of whether or not to use the burst storage 108 is based on the data throughput requirements of the particular application. If the burst storage 108 is not used, data travels via the high speed 30 MHz transfer bus 122 to the long term storage 110. Therefore, if the 30 MHz data transfer rate of the high speed 30 MHz transfer bus 122 is sufficient, the burst storage 108 need not be used. Significantly, as will be explained shortly, if the averaging circuit 106 is being used the amount of data which must be transferred for a given number of samples at a given resolution is greatly reduced compared to when the averaging circuit is not used.

To better appreciate the impact of averaging and data throughput on the decision of whether or not to use the burst storage 108 the following example will be considered. In this example it is assumed that the ADC 104 (FIG. 2) on a first of the five cards 100 (FIG. 3) is set at 50 MHz and that the first of the five cards 100 is sharing the 30 MHz transfer bus 122 with four other cards 100 as represented in FIG. 3.

If single shot resolution is desired on each card 100, that is, if each card 100 is to acquire and retain data with 50 MHz accuracy and not use averaging, then the burst storage 108 must be used since the pass through requirement of 50 MHz far exceeds the transfer bus 122 limitation of 6 MHz per card or 30 MHz total. Alternatively, if the burst storage 108 is not used a minimum of nine averages must be obtained. Performing the nine averages reduces the amount of data which must be placed on the transfer bus 122 to approximately 5.6 MHz (50 MHz/6 MHz) which is within the 6 MHz per card limitation of the transfer bus 122.

As is known in the art, the long term storage 110 will eventually fill as data acquisition continues over a long period of time. Those skilled in the art will, however, know of available data storage processing and data compression techniques which, when combined with now available mass storage devices allow a data acquisition system to be configured which can accommodate long term storage of nearly any practical test condition.

In the preferred embodiment of the present invention the burst storage 108 is able to hold a maximum of approximately 4 million samples per card 100. If single shot resolution with no averaging is used, each card 100 could store approximately 80 milliseconds worth of data (4 MSamples/50 MHz). At the end of the 80 millisecond period the card 100 would transfer its data from the burst storage 108 to the long term storage 110 via the 30 MHz transfer bus 122. This would take approximately 133 milliseconds (4 MSamples/30 MHz). At the end of placing the data on the transfer bus 122, the card 100 is reset and another acquisition period can begin.

As mentioned, averaging of the acquired data has numerous advantages. Averaging, however, is not suitable in all cases. In accordance with another aspect of the present inventions averaging of the acquired data takes place in real time and without slowing the throughput of the data.

Importantly, the method and apparatus of the present invention uses the sum of quotients technique to perform real time averaging. In the sum of the quotients technique, successive samples of x/N are added together, where x is the sample and N is the number of samples to be averaged. As explained earlier, the number of samples to be averaged during a test is selected before the beginning of the test.

Figure 4:
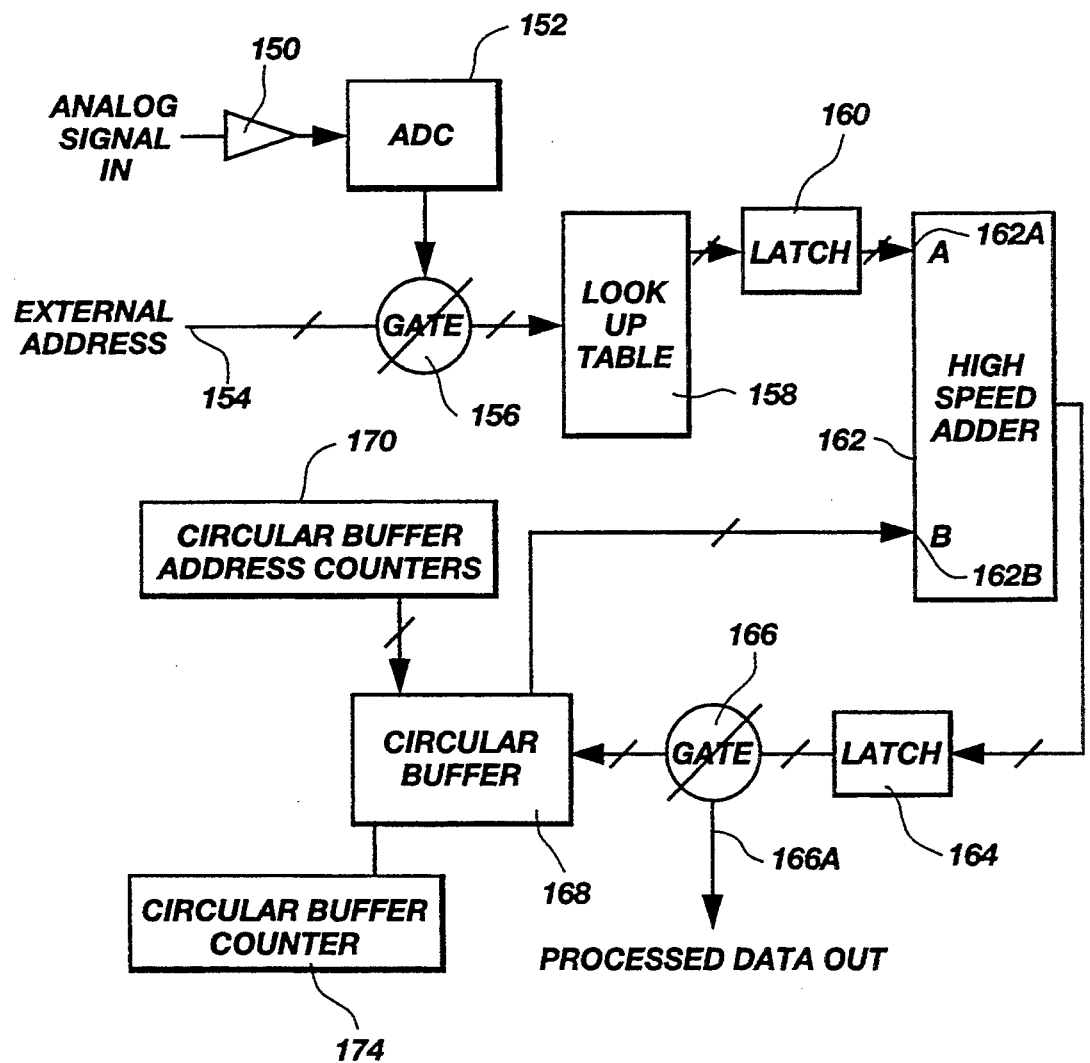
FIG. 4 is a block diagram representing the presently preferred averaging circuit included in the embodiments of the present invention.

In order to implement the method of calculating averages in accordance with the present invention, the presently preferred embodiment of the present invention utilizes the circuits represented by the block diagram of FIG. 4. It is to be understood that the averaging circuit 108 illustrated in FIG. 2 is merely the presently preferred example of carrying out the present invention. Using the information contained herein, those skilled in the pertinent art will be able to provide detailed circuit arrangements to carry out the functions represented by FIG. 4.

The averaging circuit of the present invention is a high speed averager. The components of the data acquisition system which digitize the incoming analog signal are also illustrated in FIG. 4 to facilitate this explanation.

In FIG. 4 an ADC 152 is represented as well as an amplifier 150 which represents the circuitry necessary to process the analog signal which is input to the averaging circuit. The preferred averaging circuit of the present invention includes three principal components: an averaging look-up table (LUT) 158, a high speed adder 162, and a circular buffer 168. Gates 156 and 166, latches 160 and 164, and circular buffer address counter 170 are also included.

The operation of the averaging circuit will be explained by reference to the flow chart of FIG. 5 and the block diagram of FIG. 4.

The first step in the presently preferred averaging method is test initialization as represented at step 176. As used herein and in the art generally, the term test refers to the period over which data will be gathered. The test initialization step 176 includes initializing the appropriate counters, including the circular buffer address counter 170, and initializing the look-up table 158. The test initialization step 176 requires that the user supply information regarding the number of samples and the number of time windows (scans) to be obtained during the test. The number of samples determines the length of the time window (scan).

In practice the user enters the length of the time window (scan) and the data acquisition system of the present invention determines the appropriate number of samples. For example, if 1,000 samples are required, and the ADC sampling rate will be 100 MHz (one sample every 10 nanoseconds), the length of the time window (scan) is 10 seconds (10 nanoseconds × 1,000 samples). The number of time windows (scans) is the number of averages taken.

Step 178 is to load the look-up table (LUT) 158. The LUT 178 preferably comprises fast static random access memory (and associated circuitry) that can be addressed and provide data at a rate greater than the sampling rate. The LUT 158 performs critical functions for the method of averaging in accordance with the present invention.

The present averaging method using the LUT 158 takes advantage of the fact that the number of time windows or scans (averages) is known prior to the acquisition of any data. In contrast, prior art averaging data acquisition systems sum data points until the required number of time windows (scans) have been taken and then perform a division by the number of time windows (scans) to determine the actual average. In the averaging method of the present invention, however, all averaging is performed before the test begins by dividing each possible ADC 152 resolution value by the number of time windows (scans), storing resulting quotients in the LUT 158 before the test and then during the test summing the quotients in the high speed adder 162 until the appropriate number of time windows (scans) has been achieved.

The use of an LUT 158 which is loaded with all possible average values allows the time consuming task of performing a division operation at the end of each time window (scan) to be eliminated. As the number of time windows (scans) approaches one (1), the efficiency of the data acquisition system of the present invention becomes very advantageous.

The maximum data loss period is equal to the time window (scan) length following each averaging period. For example, in the previous example using a 100 MHz sampling rate and 1,000 samples with 200 averages being taken, there would be a 10 $\mu$second "dead" time following each 2 millisecond acquisition period.

After the test initialization step 176, the step 178 of loading the LUT 158 is carried out. It will be appreciated that one LUT 158 is present on each card (100 in FIG. 3). The LUT 158 is loaded with the values x/N with $x_0/N$ being loaded into row 0, $x_1/N$ being loaded into row 1 and so on. The integer value, x, ranges from 0 to $(2^n-1)$ where n is the bit resolution of the ADC 152. It is preferred that the bit resolution be set at 8 bits which gives x values from 0 to 255. Other values, however, can also be used for the bit resolution within the scope of the present invention. N is the number of time windows (scans) requested by the user. From the foregoing, it will be appreciated that the ADC 152 outputs a binary number from 0 to $(2^n-1)$ which becomes the address in the LUT 158 to access the value in the LUT 158 for that particular binary number output from the ADC 152 divided by the number of time windows (scans).

It will be appreciated that when using the described averaging method significant round off errors can occur as the value of $X_{i/N}$ approaches one. For example, a 20-bit wide LUT 158 could have worst case round off errors in excess of 50% (assuming an 8-bit ADC, 4K averages). When, however, a 32-bit wide LUT 158 is used a worst case round off error of less than 0.015% results. Significantly, if the number of time windows (scans) is a binary number, the round off error is zero in both the case of the 20-bit wide LUT and the 32-bit wide LUT. Still, it is an advantage of the averaging method of the present invention that the number of time windows (scans) is not limited to binary increments which is required in some prior art data acquisition systems.

In step 180, the circular buffer counter 174, which monitors the current time window sequence and thus is also referred to as a time window counter or a scan counter, is loaded with a value equal to the number of time windows (scans) minus one where the number of time windows (scans) is equivalent to the user specified number of averages desired.

The next step 182 is to initialize the circular buffer address counter 170. The circular buffer 168 comprises high speed memory that is $X_{CB}$ bits (column) by $Y_{CB}$ bits (row). As the value of $X_{CB}$ approaches $X_{i/N}$, round off error decreases and end accuracy increases. The value $Y_{CB}$ correlates directly with the number of samples allowed. The circular buffer address counter 170 selects the appropriate bin in the circular buffer 168. For the initial sample sequence the circular buffer address counter 170 selects bin 0, the next sample the circular buffer address counter 170 selects bin 1, the next sample the circular buffer address counter 170 selects bin 2, and so forth. The circular buffer 168 is initialized with all zeros in each bin prior to each time windows (scan) sequence.

Next, at step 184 the ADC 152 clock is started. At step 186 the ADC 152 converts the inputted analog signal to an equivalent digital signal. The gate 156 is selected to port, via an externally generated address 154, the digital signal to the address lines present on the LUT 158. The externally generated address 154 is provided by a host processor which will be described later. The digitized value which is output from the ADC 152 is used as an address that points to the location in the LUT 158 which holds the equivalent of the digitized value divided by the number of time windows (scans).

The LUT 158 responds to the address presented to it by producing the appropriate quotient value (as loaded in step 178) at its outputs.

A convention for identifying the particular sample in this explanation will be $[x_i/N]_j$ where i refers to the ith sample in the time window to be digitized and j refers to the jth time window to be averaged. The first x/N value, $[X_1/N]_1$, will be presented to the high speed adder 162 to be summed with the value stored in the first location of the circular buffer 168, CB[1]. The initial data in the circular buffer 168 are all zero therefore the sum, $[X_1/N]_1 + CB[1]$ will be $[x_1/N]_1$. This value is then written into the location CB[1]. The next clock cycle of the ADC 152 will present the second x/N value, $[x_2/N]_1$, and increment the circular buffer address counter 170. The data summed by the high speed adder 162 will be $[x_2/N]_1$ and CB[2] which will result in the sum $[x_2/N]_1$. This value is written into the location CB[2]. This procedure continues for the length of the time window to be digitized.

The circular buffer address counter 170 is then reset and the next time window begins. The first value output from the ADC 152 will again be some $[x_1/N]_2$. This time the data presented to the high speed adder 162 will be $[x_1/N]_2$ and CB[1]. The data previously stored in CB[1] as $[x_1/N]_1$ and the high speed adder 162 will then sum $[x_1/N]_1$ and $[x_1/N]_2$. This sum will be written into location CB[1]. As before, the next clock cycle of the ADC 152 will increment the circular buffer address counter 170 and preset CB[2] and $[x_2/N]_2$ to the high speed adder 162. The sum of $[x_2/N]_1$ and $[x_2/N]_2$ will be written to CB[2]. These operations continue until j=N. A further explanation of these steps with reference to the flow chart of FIG. 5 will now be provided.

At this point the data stored in the circular buffer 168 is given by Equation (7):

$$\sum_{i=1}^{t} \frac{x_i}{N} \quad (7)$$

where t is the number of samples in each time window to be digitized and N is the number of time windows to be averaged. This data is by definition the sample average of each sample over N time windows.

The next step 188 is to latch the look-up table data. During this same period of time the circular buffer 168 has been loading the high speed adder 168 with the summed value which corresponds to the exact time slice in the previous time window (scan). If this is the first time window (scan), the number presented by the circular buffer 168 is zero.

As mentioned above, when the correct data is presented at port B (162B) of the high speed adder 162, the output of the latch 160 is enabled (Step 192). When the output of the latch 160 is enabled step 190 is carried out, which is to sum the look-up table and circular buffer data as explained. The result is then held in the latch 164 until the circular buffer 168 is ready to receive the new sum. At this time the output of the latch 164 is enabled, and step 194, which is to write to the circular buffer 168, is carried out. If the number of time windows (scans) is set to 1, the circular buffer 168 is bypassed, and data is ported through the gate 166 to a host computer, such as a IBM PC compatible computer, which functions to interface with the data acquisition system.

During the next step 196, the circular buffer address counter 170 is incremented so the next appropriate bin in the circular buffer 168 is selected and the correct sum is loaded into the high speed adder 162. At step 198 the circular buffer's address counter 170 is compared to the user specified number of samples. If the circular buffer address counter 170 is not equivalent to the total number of time windows (scans) to be completed, step 200 is carried out wherein the circular buffer counter 174 is decremented. Next, the value of the circular buffer counter 174 is compared to zero at step 202. If the value of the circular buffer counter 174 is equivalent to zero the data acquisition system ceases to acquire data. If the value of the time window counter is not equivalent to zero, the data acquisition system returns to step 182 (initialize the circular buffer address counter for a zero starting point) and step 184 (start the ADC clock) and subsequent steps to acquire additional samples are carried out.

Figure 5:
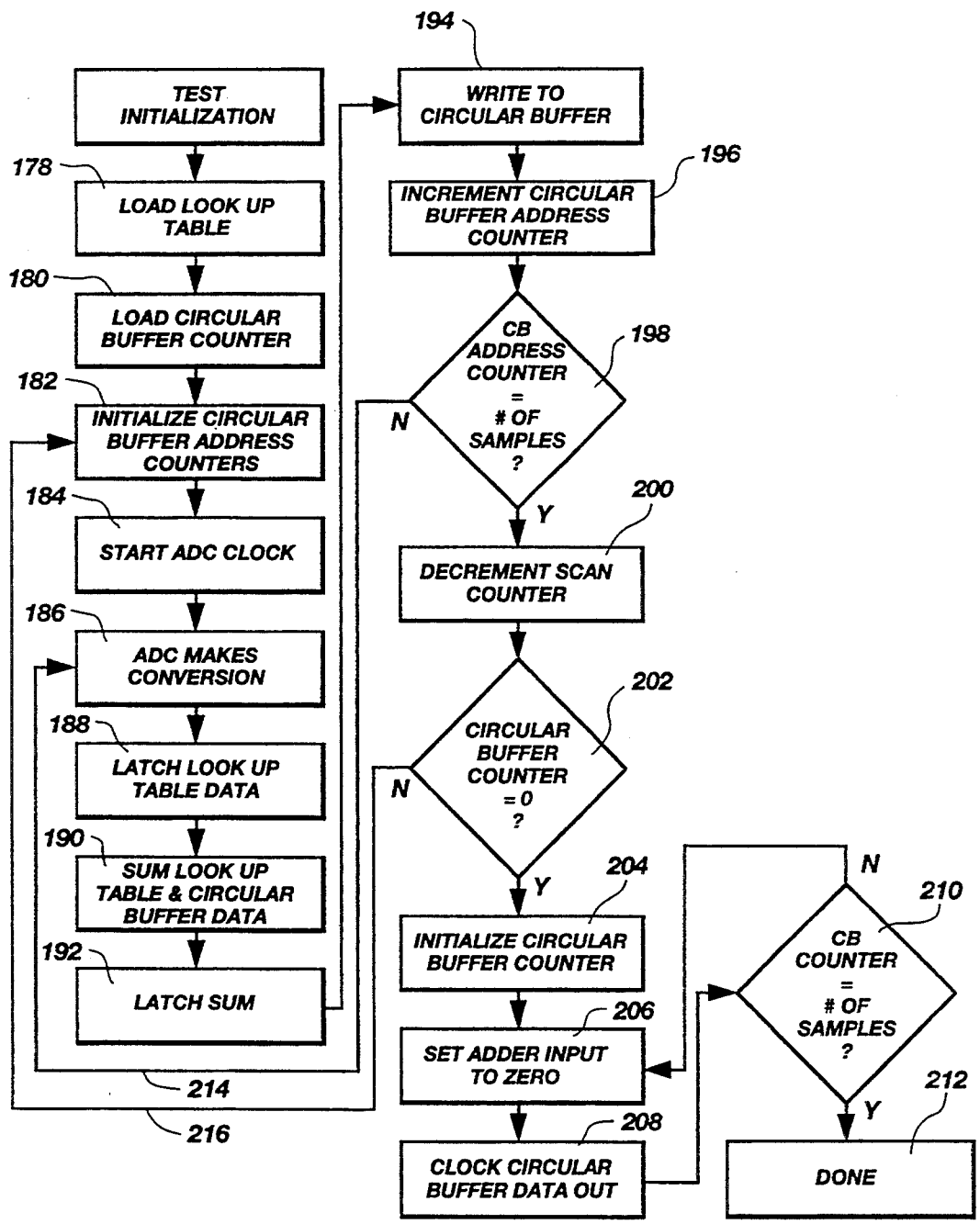
FIG. 5 is a flow chart representing the presently preferred averaging steps carried out by the method of the present invention.

It will be noted that both a primary inside loop 214 and a secondary outside loop 216 are present in FIG. 5. In the primary inside loop 214 the data acquisition system is sequencing through the steps, acquiring samples, and filling the circular buffer 168 with new summed data. The primary inside loop 214 is completed at the end of each time window (scan). Completing a time window (scan) triggers an event on the secondary outside loop 216 which monitors the number of time windows (scans).

When the specified number of time windows (scans) has been completed, the acquisition process stops until the data can be removed from the circular buffer 168. The first step in this process is to initialize a circular buffer counter 174, as represented at step 204, causing bin 0 to be selected as the beginning data source. Next at step 206, the high speed adder input port A (162A) is set to zero. At step 208 the data in the circular buffer 208 is clocked out through the high speed adder. As represented at step 210, when the circular buffer counter 174 is equivalent to the number of samples taken, the averaging method of the present invention is done (step 212). In this way, the data in the circular buffer 168 is completely ported out through the gate output 166A. If at step 210 the circular buffer counter 174 is not equivalent to the number of samples taken, control returns to step 206 and the subsequent steps are carried out until the averaging method is done.

It is preferred that the circuits used to carry out the functions represented by FIG. 4 utilize emitter coupled logic (ECL) as is known in the art. The ADC 152 is preferably an Analog Devices AD9028 integrated circuit which is capable of 250 MSamples/second with a 200 MHz analog bandwidth. The outputs of the AD9028 integrated circuit are 100K ECL compatible. The analog to digital outputs of the AD9028 integrated circuit are gated through 100104 type NAND gates. This gating is done to allow the AD9028 integrated circuit or a host processor to access the LUT address lines. An address bus 154 is provided to allow the host processor access to the LUT address lines. The LUT is preferably comprised of five 100E422 256×4 high speed SRAMs. The LUT width is 20 bits which will allow up to $2^2$ averages. The data output from the LUT is routed along a bus to five CBX1138 high speed arithmetic logic units (ALUs) configured as adders. The adders are further enhanced by a CBX1111 integrated circuit look ahead carry generator. The summed data is routed along a bus to the circular buffer. The bus is gated through 100104 type NAND gates to allow for zeroing of the circular buffer.

The circular buffer is comprised of five 100E474 4K×4 high speed SRAMs. This configuration allows for a total sample depth of 4K samples. The circular buffer output is routed along a bus through 100150 type latches back to the high speed adder. The 100150 latches will keep the data at the high speed adder stable since the output of the high speed adder is routed directly back to the circular buffer. The address for the circular buffer is supplied by 100016 type synchronous counters. The synchronous counters are configured so the host processor can preload the number of samples to be digitized in each time window.

All high speed logic paths are preferably designed using Motorola ECLPS logic with the exception of the adder devices which are designed with Sony SPECL logic. All logic circuits are 100K ECL compatible with sub nanosecond propagation delays. Circuit connections follow Microstrip and Stripline transmission line conventions as are known in the art.

Figure 6:
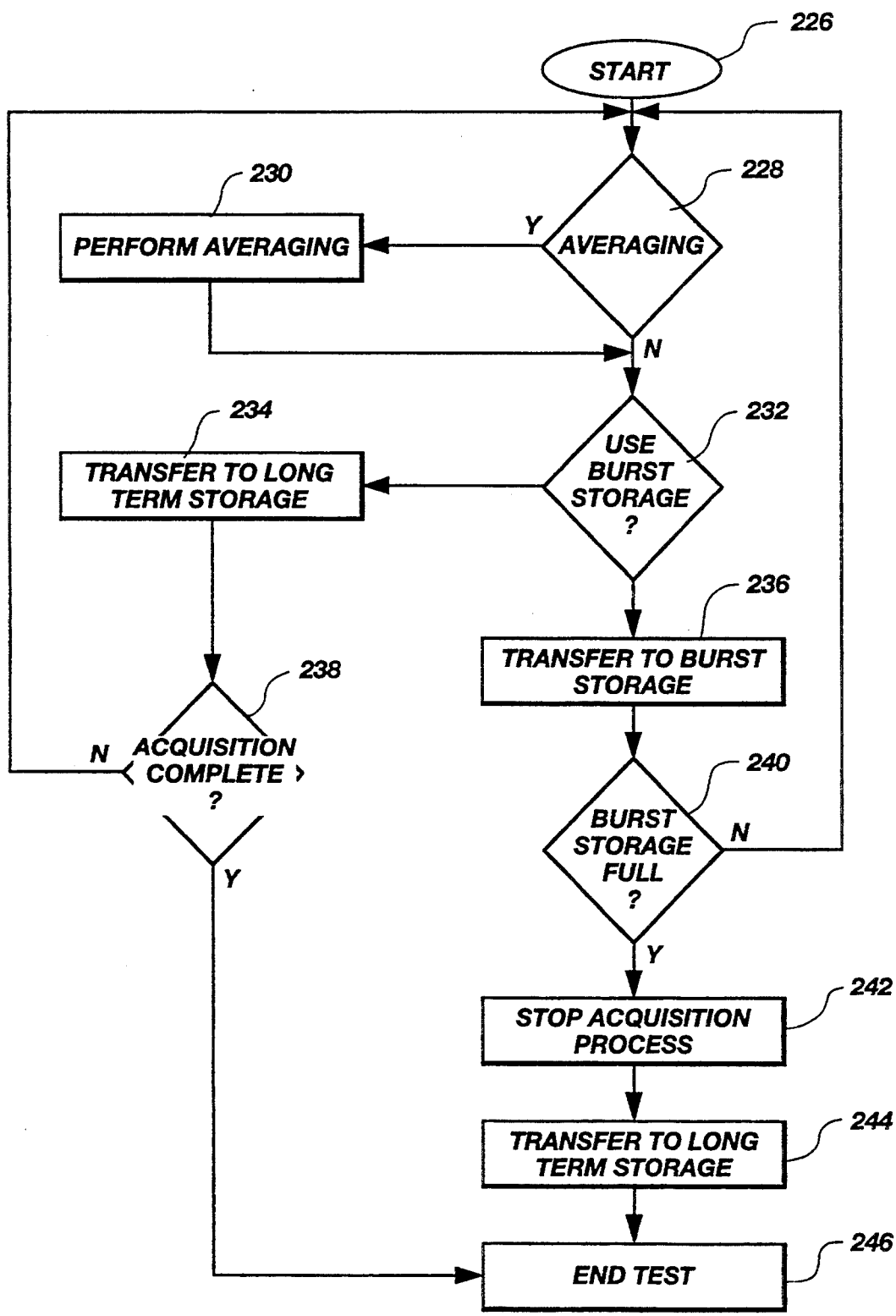
FIG. 6 is a flow chart representing the presently preferred steps carried out by the preferred embodiment of the present invention.

Reference will now be made to the high level flow chart of FIG. 6 to provide further explanation of the operation of the presently preferred embodiment of the present invention. Starting at step 226 before the beginning of a test, the first step 228 is the decision to use or not use averaging (averaging circuit 106 in FIG. 2). If it is decided to use averaging, averaging is performed at step 230. At the next step 232, the decision is made whether or not to use burst storage (108 in FIG. 2). If burst storage is not used, data is transferred to long term storage at step 224. Otherwise, data is transferred to burst storage at step 226.

A decision is next made at step 240 regarding whether burst storage is, or is not, full. If burst storage is not full, the method returns to step 228. If burst storage is full, the data acquisition process is stopped at step 242 and data is transferred to long term storage at step 244. If burst storage is riot used, the decision is made at step 238 whether or not acquisition of data is complete. If acquisition of data is not complete the method returns to step 228. If acquisition of data is complete (step 238) or the transfer from burst storage to long term storage is complete (step 244), the test is ended at step 246.

It will be appreciated that the data acquisition system of the present invention has many different applications. One particular application to which the data acquisition system of the present invention is particularly well suited will be described next.

Figure 7:
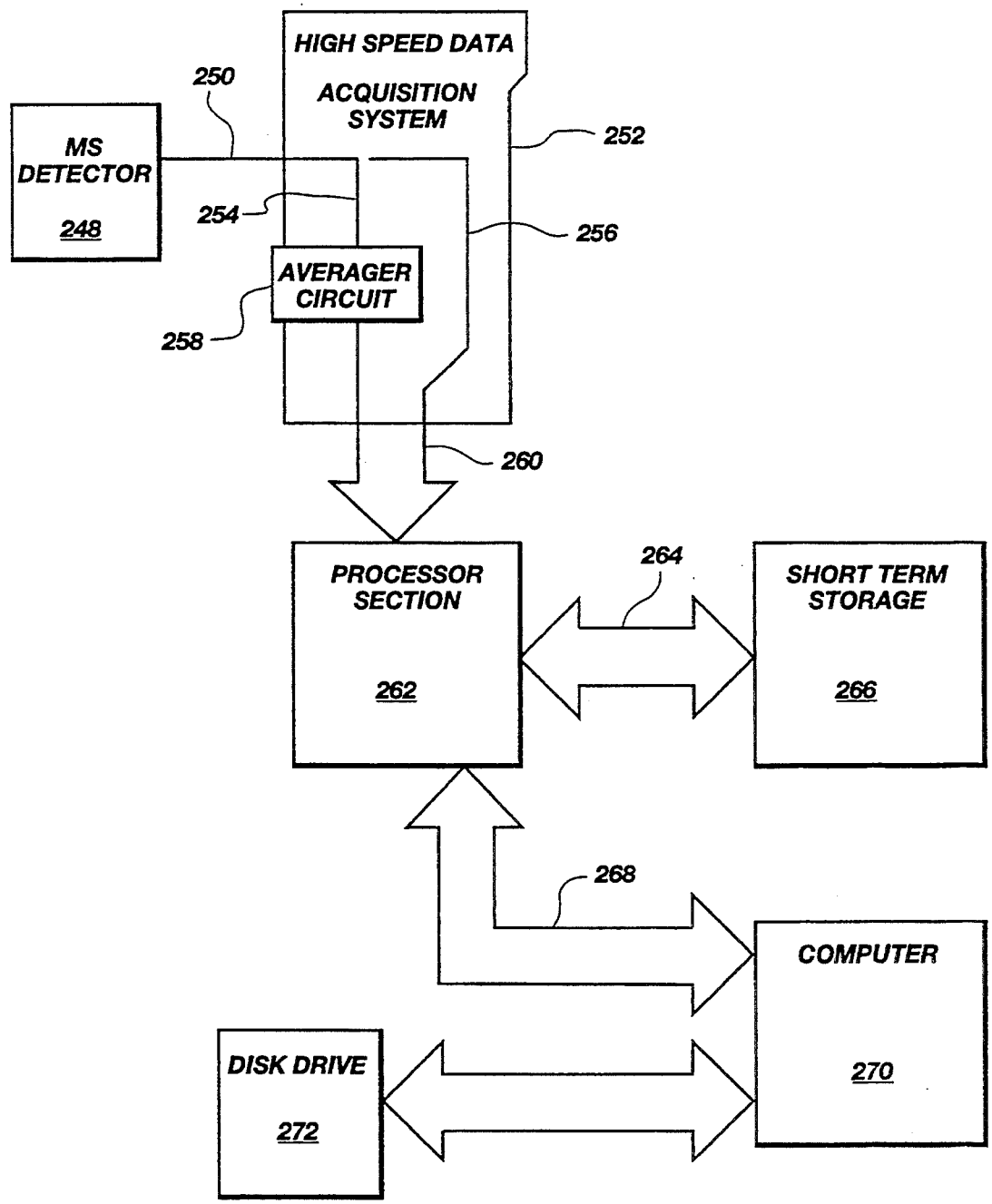
FIG. 7 is a high level block diagram of a presently preferred example of the present invention particularly adapted for carrying out high speed time-of-flight mass spectrometry.

Provided in FIG. 7 is a high level block diagram of a time-of-flight mass spectrometer (TOFMS) which includes the data acquisition system of the present invention. From the forgoing discussion, it will be appreciated that the scan speed (200 μs/scan) of the time-of-flight mass spectrometer is limited by storage capabilities and data logging technology, rather than by the fundamental mass separation process. Thus, the exemplary mass spectrometer described herein is not to be considered limiting of the scope of the present invention.

The time-of-flight mass spectrometer described herein generates a large volume of data. The high-speed data acquisition system of the present invention acquires and compresses the large volume of data accumulated by the mass spectrometer into a format that can be handled in a microcomputer environment, for example an IBM PC compatible computer, 270 in FIG. 7. It will be appreciated that a large memory space and fast electronics are required to process the 5,000 spectra which are generated each second.

As explained earlier, the user must enter certain test parameters at the beginning of each test. In the time-of-flight mass spectrometer of the present invention the user must enter the foiLlowing parameters.

One parameter which the user enters is the mass spectrum slice (MS slice). This is the portion of the total 200 μs scan to be analyzed and is typically between 30 μs and 50 μs. The time-of-flight mass spectrometer described herein can analyze the entire length of the scan but data storage requirements increase proportionally. That is, analyzing the full 200 μs scan produces 100,000 (200 μs/2 ns) samples at a 5 KHz rate, or 500 Msamples/second. On the other hand, if the MS slice is set to 30 μs, the data rate is reduced to 75 MSamples/second.

The user also enters a value for the peak width/points per peak (i.e., resolution). This is a resolution based parameter and may deal with either a mass spectrum or a chromatographic composite, depending on the resolution boundary. For example, if a short term, high speed chromatographic run requires mass spectra resolution of 5 points across a 10 ns wide peak with single shot data retention, a "zero average" parameter is entered into the time-of-flight mass spectrometer represented in FIG. 7. With a zero average parameter being entered, every point measured will be retained. Such a test deals with high resolution in the mass spectral range.

Alternatively, another typical test might require 5 points across a 2 second peak of a two or three hour chromatographic run. In this case the resolution definition shifts from the mass spectrum to the chromatogram. To accomplish this, a newly averaged chromatographic point would be produced every 400 ms (2 second/5), allowing up to 2,000 averages per point and reducing the required data rate to 37.5 KSamples/second (assuming a 30 μs MS slice).

The peak width/points per peak setting, therefore, determines a key element for the test—the number of averages per point. It is preferred that the user of the time-of-flight mass spectrometer enter this value directly into the computer 270 which then communicates the necessary commands to the other components in the time-of-flight mass spectrometer.

The user also enters the retention time into the computer 270. The retention time determines the length of the test. For a high speed test where the data flow rates output from the data acquisition system range from approximately 5 MSamples/second to more than 25 MSamples/second, the retention time is limited by available high speed RAM, i.e., the burst storage represented at 108 in FIG. 2, in the high speed data acquisition system 252 portion of the time-of-flight mass spectrometer. In the test described above (2 ns continuous sampling with a 30 μs MS slice), the test could be run for approximately 200 ms with 16 Mbytes of installed high speed RAM as burst storage.

When conducting a similar test with averages set to approximately ten, the high speed RAM burst storage can be bypassed and the data could be ported directly to a larger memory area. This would allow the retention time to be extended considerably.

Referring still to FIG. 7, an analog signal is presented to the input 250 of the data acquisition system 252. The analog signal is preferably a 2 volt peak-to-peak signal. Upon input of the MS slice and resolution parameters by the user, the time-of-flight mass spectrometer determines the appropriate data path to be used in the data acquisition system: (1) pass through path 254 or (2) high speed path 256.

If the pass through path 254 is used, the data acquisition system converts the analog signal input at 250 from an mass spectrometer detector 248 to a digital signal, performs any necessary averaging by averaging circuit 258, and dynamically stores the burst of data in the burst storage high speed RAM, which serves as a pseudo "single shot" buffer. This occurs during the actual burst of data. The functions and structure of the data acquisition system 252 is substantially the same .as that explained in connection with FIGS. 2 and 3.

The data leaving the data acquisition system 252 is ported through a first bus 260 while the next averaging cycle occurs in the data acquisition system 252. No new data is taken into the burst storage high speed RAM until the old data is removed. The number of averages required under this scenario is, therefore, determined by the speed at which data may be taken across the first bus 262 into a processor section 262.

Averaging is preferably accomplished by the method explained in connection with FIGS. 4 and 5. Thus, the output from an analog to digital converter (ADC) contained in the data acquisition system 252 is divided by the expected total number of averages and then summing each divided output through the duration of the averaging cycle. Divided output values and their corresponding summations are preferably 24-bit fixed point numbers with 16 bits to the right of the radix. The 24-bit requirement is based on the maximum number of expected averages, in this preferred example of the time-of-flight mass spectrometer, approximately 65K.

Those skilled in the art will be able to devise the hardware and software necessary to carry out the described operations in order to retain accurate amplitude information. The number of bits necessary to retain .accurate amplitude information is generally no more than 10 to 11 bits. That is, the ADC performs a mapping from the continuous domain to the discreet domain with a range of continuous input being mapped to a single discreet output. Under worst case conditions the resulting conversion (rounding) error invalidates the data beyond 11 bits. Generally, the actual results are much better than the results produced by such worst case conditions.

The high speed path 256 is similar in architecture and somewhat similar in operation to the pass through path 254 but the overall result is markedly different. In the time-of-flight mass spectrometer represented in FIG. 7, the data is transferred into the burst storage high speed RAM but is not ported out between averages. The high speed path 256 is used when no averaging is required. When using the high speed path 256, the burst storage is required to retain the data for the entire test and no data is transferred out of the burst storage until the test has concluded. In practice, tests that use the high speed path 256 generally have test times of less than 1 or 2 seconds.

The data output from the data acquisition system 252 onto the first bus 260 is conveyed to the processor section 262 via the first bus 260. The first bus 260 is preferably a 30 MHZ 16 bit bus which carries uncompressed data which is output from the data acquisition system 252.

The processor section 262 consists of an array of processors placed in a parallel operating architecture, each capable of retrieving data from the first bus 260. Those skilled in the art will be able to fabricate such processors using the information contained herein. The processor section 262 is responsible for two major tasks: processing incoming data from the data acquisition system 252 and managing data for post processing tasks.

For the task of processing incoming data from the data acquisition system 252, one of the processors in the processor section 262 is assigned a data watch period, during which time it monitors the first bus 260 and gathers 127 samples of data at approximately 25 MSamples/second. This is accomplished in approximately 5 $\mu$s. These are 127 contiguous samples; that is, the data is demultiplexed at this point. Once the data is accumulated in the one of the processor's on-board RAM it is compressed and transferred along a second bus 264 to a short term storage 266. This process will require an additional 80 $\mu$s. After 5 $\mu$s, the first processor in the processor section 262 has retrieved 127 samples and has freed the first bus 260. At that point a second processor in the processor section 262 can access the first bus 260 and duplicate the process carried out by the first processor of the processor section 262.

It will be appreciated that a potential bottleneck is at second bus 264 which is used to transfer data to short term storage 266 since the second bus is also a shared bus. However, because the data output from the processor section 262 is compressed, there is less data flowing across the second bus 264 than across the first bus 260 and the transfer time should be much less than the 5 $\mu$s first bus 260 transfer time. It will be appreciated that for optimum results in many cases, seventeen processors (85 $\mu$s/5 $\mu$s) should be included in the processor section 262. This produces a data flow rate of up to 25 MSamples/second. Each processor in the processor section 262 is preferably capable of processing approximately 1 to 2 MSamples/second.

In the processor section 262, two steps of continuous data compression are preferably used to insure maximum data compression/recovery efficiency. The first step preferably involves a delta compression technique whereby only the difference signal between sample x and sample x+1 is retained. The second step of data compression is a variation of run length encoded compression. Run length encoded compression is encoded as a 2-byte field whereby the number of contiguous bytes of redundant data is stored in the first byte (up to 127 redundant bytes) and the value of the redundant data is stored in the second byte. If the noise floor does not exceed the 8 least significant bits of 16-bit data (N/S less than 0.38%), and the test data is replete with constant offset contiguous data, a compression factor of better than 90% can be realized. As a worst case scenario, if the absolute delta value between sample x and sample x+1 exceeds 255, and the actual data has no contiguous redundancy, no compression takes place. Those skilled in the art will be familiar with the implementation of the described data compression techniques.

As mentioned earlier, the processor section 262 is also responsible for managing data for post processing tasks. The computer 270 provides an interface with the user for requesting that a post processing routine be carried out by the processor section 262. The post processing routines which are preferably carried out include those set forth below.

One post processing routine is a screen view of a chromatogram. This includes retrieving a new chromatogram or zooming or expanding on an existing one. Those skilled in the art will appreciate that at any one time there are only 715 points of a chromatogram displayed on the screen, when, in reality there may be many more thousands of points stored in memory. Since a point on a chromatogram consists of the summation of the entire mass spectrum for that point, there is a substantial number of calculations required to produce that point. For example, to produce one point of a chromatogram, which has the MS slice set to 30 µs, requires 15,000 calculations (30 µs/2 ns). Displaying 715 of these points on the computer monitor requires more than 10 million such calculations. Using the hardware of the time-of-flight mass spectrometer described herein, it may be desirable to calculate one time for every possible point and store the results in a file on a mass storage device.

Another post processing routine is a screen view of a mass spectrum. Normally, a mass spectrum is retrieved using the chromatogram as the basis. That is, the user selects a point of the chronatogram displayed on the computer 270 and the corresponding mass spectrum is produced. If the MS slice parameter is set to 30 µs, this requires the retrieval and decompression of approximately 118 blocks (15,000/127) of data and the filtering of the appropriate 715 points of that data for screen display. The time-of-flight mass spectrometer represented in FIG. 7 also preferably provides zooming and expanding on a mass spectrum with the same process required to produce and view the data.

Still another post processing routine is a screen view of a contour plot. A contour plot adds another dimension to the screen view of a mass spectrum and the total number of points required expands accordingly. A typical contour plot requires 300 vertical mass spectra points plotted against 715 time points, for a total of 214,500 points.

Yet another of the post processing routines are numerical presentations. Detailed analysis using actual numerical data is accomplished in similar ways for the screen views of a chromatogram, mass spectrum, and contour plot described above. The major difference is that the data transferred from the processor section is not limited to 715 points. Indeed, it is possible to display every point acquired, as desired by the user.

A further post processing routine is providing printer output. The printer output routines are similar to the screen view routines except for the resolution differences. With a typical laser printer which is capable of 300 dpi, allowing a typical plot (in landscape mode) to be printed with over 2,500 dots of resolution is desirable. In handling this requirement, the system follows the same process as it does for screen viewing except for the resolution differences.

When a post processing request is made, a processor in the processor section 260 is assigned a data watch period during which time it monitors the second bus 264 and retrieves the compressed equivalent of a 127 sample block of data (i.e., 127 contiguous samples). In many cases, this block is only 10 to 20 bytes long, meaning that the transfer time for the block is less than 1 µs. This time includes the additional 80 ns required for addressing the RAM in short term storage 266 over the time required for addressing the burst storage RAM in the data acquisition system 252. As is the case when in the acquisition mode, once a first processor in the processor section 262 has the data stored in its on-board RAM, it passes bus control to the next processor where the process starts again with the next contiguous block of samples.

The method used (and therefore the time required) to post process the data is dependent upon the type of output desired. A chromatographic output requires the summation of each point, with the result stored in a temporary buffer. In the worst case, this process does not take longer than 80 µs (600 ns×127) per block of data. To process a test with MS slice set at 30 µs using eight processors typically requires approximately 0.8 seconds (10,000,000×80 µs/127×8). The method for calculating a mass spectrum is somewhat different. Extracting the 715 required points requires just over 1 millisecond (15,000×600 ns/8); again, eight processors and a 30 µs MS slice are assumed. The contour plots require the additional time scaling time; this effectively multiplies the 1 millisecond time by a factor of 715, bringing the total to approximately 1 second.

From an architectural standpoint, post processing routines include any process that sends data from the processor section 262 across a high speed serial link 268 to the computer 270. All the screen viewing post processing routines may be accomplished on a pseudo real time basis as the data input to the data acquisition system 252 is being collected. The architecture of the time-of-flight mass spectrometer lends itself well to dynamic allocation of processors to separate tasks, depending upon the user and application demands.

As an example, a test is conducted which takes 2 hours. The resolution required dictates an average factor of 2,000 and the MS slice is set to 30 µs. The required data throughput is then 37.5 KSamples/second (5,000 Hz/2,000 averages×15,000 points per average) well within the capability range of a single processor in the processor section 262 to handle all of the acquisition needs. Also assume that eight processors are installed in the processor section 262. This leaves seven processors available for post processing tasks. As the data acquisition throughput rate increases, so does the need for more processors to process the data. It is preferred that each processor in the processor section 262 be capable of processing about 1.5 MSamples/second. The time-of-flight mass spectrometer described herein, therefore, is designed so that allocation of processors in the processor section 262 is dependent upon the acquisition demands, with the acquisition tasks receiving priority allocation. That is, if a test requires five processors for acquisition, they are allocated as such. The rest of the processors are available for post processing. In this way it is ensured that no data is ever lost during acquisition. Before each test, the user is provided with a message on the computer 270 screen indicating what portions of processing power are being allocated to which tasks, allowing him to alter his test parameters if desired.

Still referring to FIG. 7, the short term storage 266 is preferably comprised of a single large block of dynamic RAM that may be expanded up to 2 gigabytes. The short term storage 266 functions to retain compressed data during an acquisition. The RAM in the short term storage 266 preferably provides for fast retrieval and storage, i.e., much faster than disk drive storage. The use of the short term storage 266 benefits both acquisition tasks and post processing tasks as the data throughput rates increase significantly.

The short term storage 266 should be large enough to handle typical test data. Because the data conveyed on the second bus 264 is compressed nominally by 90%, 20 Mbyte of RAM is equivalent to approximately 200 Mbyte of raw data storage. If post processing is to be performed on a different test than the one being conducted, or several tests are being evaluated at once, the size of the RAM should be increased accordingly for maximum performance.

Also provided is a hard disk drive 272 which may be connected internally or externally to the computer 270. The resulting test data which is calculated by the processor section 262 and conveyed to the computer 270 is preferably concurrently stored on the hard disk drive 272 so that accumulated test data will not be lost in the event of a power failure. Additionally, hard disk drive 272 can be an extension of the short term storage 266 if the short term storage overfills. Performance will be degraded if the short term storage overfills.

The high speed serial link 268 is used to convey all post processed data between the processor section 268 and the computer 270 for screen display, disk write, printer output, and so forth. Also, all user requests for the time-of-flight mass spectrometer operations are sent via this the high speed serial link 268. Because the high speed serial link 268 can transmit approximately 1.5 Mbytes per second, a 715 point curve can be sent in less than 0.5 milliseconds, making the final screen coordinates transmission time trivial in comparison.

In view of the forgoing, it will be appreciated that the present invention provides an improved high speed data acquisition system and an accompanying method which can average inputted data in real time efficiently and without delaying the processing of data. The present invention also provides a data acquisition system wherein averaging of data can occur on numbers of time windows which are not binary increments and which can selectively average or not average inputted data and process the data quickly and with high resolution. The present invention also provides a data acquisition system which is particularly suitable for acquiring data from a mass spectrometer detector.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of acquiring a plurality of samples from an analog signal and averaging the analog signal during a test period, the method comprising the steps of:
   (a) determining the number of time windows of the analog signal which will be made during the test period;
   (b) calculating a plurality of values representing the plurality of potential average values of the analog signal based upon the number of time windows which will be made during the test period;
   (c) loading the plurality of potential average values into a random access memory structure;
   (d) converting the analog signal into a current digital sample;
   (e) selecting one of the potential average values which corresponds to the value of the current digital sample;
   (f) combining the potential average value which corresponds to the value of the current digital sample with any previous average value corresponding to any previous digital sample and store a total average value;
   (g) repeating steps (d) through (f) until the number of digital samples obtained at least equals the number of time windows; and
   (h) outputting the total average value.

2. A method of acquiring a plurality of samples from an analog signal and averaging the analog signal as defined in claim 1 wherein the step of calculating a plurality of values comprises the step of calculating a plurality of potential average values representing all of the possible average values of a repetitive signal based upon the number of time windows which will be made during the test period.

3. A method of acquiring a plurality of samples from an analog signal and averaging the analog signal as defined in claim 1 wherein the step of determining the number of time windows comprises the step of loading the number of time windows into a time window counter arid repeating steps (d) through (g) further comprises the step of decrementing the time window counter and repeating steps (d) though (g) until the time window counter value is zero.

4. A method of acquiring a plurality of samples from an analog signal and averaging the analog signal as defined in claim 1 wherein the step of loading the plurality of potential average values comprises the step of loading the potential average values into a look-up table.

5. A method of acquiring a plurality of samples from an analog signal and averaging the analog signal as defined in claim 4 wherein the step of combining the potential average value which corresponds to the value of the current digital sample with any previous average value corresponding to any previous digital sample comprises the steps of summing a current average value with a previous average value stored in a buffer.

6. A method of acquiring a plurality of samples from an analog signal and averaging the analog signal as defined in claim 5 wherein the step of summing a current average value with a previous average value stored in a buffer comprises the step of inputting a previous average value stored in the buffer into an adder and inputting a current average value output from the look-up table into the adder and storing the sum in the buffer.

7. A method of averaging a repetitive signal during a test period, the method comprising the steps of:
   (a) determining the number of time windows of the repetitive signal which will be made during the test period;
   (b) calculating a plurality of potential average values representing all of the possible average values of the repetitive signal based upon the number of time windows which will be made during the test period and the resolution of the repetitive signal;
   (c) loading the plurality of potential average values into a look-up table;
   (d) converting the repetitive signal into a current digital sample;
   (e) selecting a current average value from the look-up table which corresponds to the value of the current digital sample;
   (f) summing the current average value with a sum of all previous average values stored in a buffer, each previous average value corresponding to at least one average value selected from the look-up table corresponding to at least one previous digital sample to provide a new sum of all previous average values;
   (g) storing the sum in the buffer; and (h) repeating steps (d) through (g) until the number of digital samples obtained at least equals the number of time windows; and (i) outputting the value of the buffer representing the average of all of the digital samples which were obtained during the test.

8. A method of averaging a repetitive signal during a test period as defined in claim 7 wherein the step of determining the number of time windows comprises the step of loading the number of time windows into a time window counter and the step of repeating steps (d) through (g) comprises the step of decrementing the time window counter and repeating steps (d) though (g) until the time window counter value is zero.

9. A method of averaging a repetitive signal during a test period as defined in claim 7 wherein the step of summing the current average value with a sum of previous average values stored in a buffer, comprises the step of inputting the sum of previous average values stored in the buffer into an adder and inputting the current average value output from the look-up table into the adder and storing the sum in the buffer.

10. A method of averaging a repetitive signal during a test period as defined in claim 7 wherein the step of outputting the value of the buffer comprises the step of clocking the data out of a circular buffer.

11. A method of averaging a repetitive signal during a test period as defined in claim 7 wherein the repetitive signal comprises a mass spectrometer signal and wherein the step of converting the repetitive signal into a current digital sample comprises the step of converting a mass spectrometer signal into a digital sample.

12. A system for averaging a repetitive signal during a test period, the system comprising:

means for user inputting of the number of time windows of the repetitive signal which will be made during the test period;

means for calculating a plurality of potential average values representing all of the possible average values of the repetitive signal based upon the number of time windows which will be made during the test period and the resolution of the repetitive signal;

look-up table means for storing the plurality of potential average values;

means for converting the repetitive signal into a current digital sample;

means for selecting a current average value from the look-up table which corresponds to the value of the current digital sample;

a buffer for storing at least one previous average value average;

means for summing the current average value with the at least one previous average value stored in the buffer, the at least one previous average value corresponding to at least one average value selected from the look-up table corresponding to at least one previous digital sample;

means for storing the resulting sum in the buffer and continuing to sum the current average value with the at least one previous average value until the number of digital samples obtained at least equals the number of time windows; and means for outputting the value of the buffer representing the average of all of the digital samples which were obtained during the test.

13. A system for averaging a repetitive signal during a test period as defined in claim 12 wherein the means for user inputting comprises a computer.

14. A system for averaging a repetitive signal during a test period as defined in claim 12 further comprising a processor section connected to the means for outputting and a computer connected to the processor section.

15. A system for averaging a repetitive signal during a test period as defined in claim 14 further comprising a mass spectrometer detector.

16. A system for averaging a repetitive signal during a test period as defined in claim 12 wherein the means for summing comprises a high speed adder and wherein the buffer comprises a circular buffer.

17. A system for averaging a repetitive signal during a test period as defined in claim 12 wherein the means for converting comprises an analog-to-digital converter.

18. A system for gathering data from a real time event, the system comprising:

means for converting an analog signal representing the real time event into a plurality of digital samples obtained over a test period;

means for averaging at least some of the digital samples;

means for real time storing the digital samples in real time;

means for long term storing of the digital samples;

means for selecting a data path which subjects the digital samples to the means for averaging before conveying the digital samples to the means for real time storing or the means for long term storing or a data path which passed the digital samples to the means for real time storing or the means for long term storing without subjecting the digital samples to the means for averaging.

19. A system for conducting mass spectrometry comprising:

a mass spectrometer detector generating an analog signal;

means for converting the analog signal into a plurality of digital samples obtained over a test period;

means for averaging at least some of the digital samples;

means for real time storing the digital samples in real time;

means for long term storing of the digital samples;

means for selecting a data path which subjects the digital samples to the means for averaging before conveying the digital samples to the means for real time storing or the means for long term storing or a data path which passed the digital samples to the means for real time storing or the means for long term storing without subjecting the digital samples to the means for averaging; and means for displaying the information gathered from the mass spectrometer detector in any one of a plurality of formats.

* * * * *